United States Patent
Iyer et al.

(10) Patent No.: US 11,100,503 B2
(45) Date of Patent: Aug. 24, 2021

(54) SYSTEMS AND METHODS FOR USE IN MANAGING DIGITAL IDENTITIES

(71) Applicant: MASTERCARD INTERNATIONAL INCORPORATED, Purchase, NY (US)

(72) Inventors: Ranjita Shankar Iyer, Chappaqua, NY (US); Robert D. Reany, New Canaan, CT (US); Ashfaq Kamal, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 110 days.

(21) Appl. No.: 15/891,062

(22) Filed: Feb. 7, 2018

(65) Prior Publication Data

US 2019/0245693 A1 Aug. 8, 2019

(51) Int. Cl.
*G06Q 20/40* (2012.01)
*G06Q 20/38* (2012.01)
(Continued)

(52) U.S. Cl.
CPC ..... *G06Q 20/4014* (2013.01); *G06Q 20/3827* (2013.01); *G06Q 20/4093* (2013.01);
(Continued)

(58) Field of Classification Search
CPC .............. H04L 9/3239; G06Q 20/3827; G06Q 20/4014; G06Q 20/4093
See application file for complete search history.

(56) References Cited

U.S. PATENT DOCUMENTS 7,680,819 B1  3/2010 Mellmer et al.
10,476,862 B2 11/2019 Kamal
(Continued)

FOREIGN PATENT DOCUMENTS

CA  2886548 A1  9/2015
EP  3073670 A1  9/2016

OTHER PUBLICATIONS

U.S. Appl. No. 16/134,371, filed Sep. 18, 2018, Bhatt et al.
(Continued)

*Primary Examiner* — John W Hayes
*Assistant Examiner* — Ari Shahabi
(74) *Attorney, Agent, or Firm* — Harness, Dickey & Pierce, P.L.C.

(57) ABSTRACT

Systems and methods are provided for managing digital identities associated with users. One exemplary method includes receiving, at a computing device, an encrypted message from a communication device associated with a user where the messaging includes a changed attribute for the user. The method also includes generating a hash of a digital identity for the user with the changed attribute, generating a hash of the digital identity of the user stored in a ledger data structure, and transmitting a request for the user to attest to the changed attribute when the generated hashes do not match. The method then further includes broadcasting a pending status of the digital identity of the user to a relying party for the digital identity, and storing a certification of the changed attribute, received from the relying party in response to the pending status, based on verification of the changed attribute by the relying party.

17 Claims, 3 Drawing Sheets

(51) Int. Cl.
*H04L 9/32* (2006.01)
*H04L 9/08* (2006.01)

(52) U.S. Cl.
CPC ............ *H04L 9/0891* (2013.01); *H04L 9/321* (2013.01); *H04L 9/3231* (2013.01); *H04L 9/3239* (2013.01); *H04L 2209/38* (2013.01)

(56) References Cited

U.S. PATENT DOCUMENTS

| | | |
|---|---|---|
| 2006/0000892 A1 | 1/2006 | Bonalle et al. |
| 2006/0157559 A1* | 7/2006 | Levy ................ G06Q 20/40145 235/380 |
| 2007/0208869 A1 | 9/2007 | Adelman et al. |
| 2007/0214093 A1 | 9/2007 | Colella |
| 2007/0250704 A1 | 10/2007 | Hallam-Baker |
| 2008/0256594 A1 | 10/2008 | Satish et al. |
| 2009/0164526 A1 | 6/2009 | Hayashi |
| 2011/0191829 A1 | 8/2011 | Fischer et al. |
| 2011/0289318 A1 | 11/2011 | Zhang et al. |
| 2014/0068722 A1 | 3/2014 | Hayat |
| 2014/0101453 A1 | 4/2014 | Senthurpandi |
| 2014/0279516 A1 | 9/2014 | Rellas et al. |
| 2015/0038118 A1 | 2/2015 | Berteau et al. |
| 2015/0059003 A1 | 2/2015 | Bouse |
| 2015/0295906 A1 | 10/2015 | Ufford et al. |
| 2015/0319170 A1 | 11/2015 | Grossemy |
| 2015/0356523 A1 | 12/2015 | Madden |
| 2016/0210621 A1 | 7/2016 | Khan |
| 2016/0239653 A1 | 8/2016 | Loughlin-Mchugh et al. |
| 2016/0300236 A1 | 10/2016 | Wiley et al. |
| 2016/0328713 A1 | 11/2016 | Ebrahimi |
| 2016/0330035 A1 | 11/2016 | Ebrahimi et al. |
| 2016/0364703 A1 | 12/2016 | Bhatt et al. |
| 2016/0364730 A1 | 12/2016 | Rans et al. |
| 2017/0201498 A1 | 7/2017 | Baig et al. |
| 2017/0222814 A1* | 8/2017 | Oberhauser ............ G06F 21/33 |
| 2017/0257358 A1 | 9/2017 | Ebrahimi et al. |
| 2017/0316409 A1 | 11/2017 | Smith et al. |
| 2018/0048864 A1 | 2/2018 | Taylor et al. |
| 2018/0165781 A1 | 6/2018 | Rodriguez et al. |
| 2018/0204191 A1 | 7/2018 | Wilson et al. |
| 2018/0351747 A1* | 12/2018 | Spangemacher . H04W 12/0804 |
| 2019/0087825 A1 | 3/2019 | Bhatt et al. |
| 2019/0089702 A1 | 3/2019 | Bhatt et al. |
| 2019/0230496 A1 | 7/2019 | Wane |

OTHER PUBLICATIONS

U.S. Appl. No. 15/476,526, filed Mar. 31, 2017, Ashfaq Kamal.
U.S. Appl. No. 16/134,348, filed Sep. 18, 2018, Bhatt et al.
F. No. K-11020/217/2018-UISAI (Auth-I), Government of India; https://uidai.gov.in/images/resource/UIDAI_Circular_11012018.pdf; Jan. 10, 2018; 5 pgs.
Times of India; Use 16-digit virtual No. for KYC; https://timesofindia.indiatimes.com/business/india-business/use-16-digit-virtual-no-for-kyc-fromtoday/articleshow/64810724.cms; web accessed Oct. 2, 2018; 56 pgs.
Economic Times; UIDAI introduces new two-layer security system to improve Aadhaar privacy; https://economictimes.indiatimes.com/news/economy/policy/uidai-introduces-new-two-layersecurity-system-to-improve-aadhaar-privacy/articleshow/62442873.cms; web accessed Oct. 2, 2018; 6 pgs.
"Moving Beyond Social Security Numbers"; Blake Hall; https://medium.com/@blake_hall/moving-beyond-social-security-numbers-part-3-283bbf28ce74; Oct. 11, 2017; 5 pgs.
"Are you overlooking toeknization as a data security measure?"; Linda Musthaler; https://www.networkworld.com/article/3002307/security/are-you-overlooking-tokenization-as-adata-security-measure.html; Nov. 6, 2015; 5 pgs.
"Digital Identity—Why Now?"; David G. W. Birch; https://www.paymentsnz.co.nz/.../Digital_Identity_Seminar_Presentation_Final.pdf; Jan. 8, 2017; 79 pgs.
"Your guide to UPI—the world's most advanced payments system"; Sasi Desai et al.; https://medium.com/wharton-fintech/your-guide-to-upi-the-worlds-most-advanced-payments-system-b4e0b372bf0b; May 11, 2017; 20 pgs.
"Lessons from the World's Largest e-Identity Program"; procivis; https://procivis.ch/2018/02/13/lessons-from-the-worlds-largest-e-identity-program-indias-aadhaar/; Feb. 13, 2018; 6 pgs.
Times of India; "Treat virtual ID, UID token as Aadhaar number"; https://timesofindia.indiatimes.com/business/india-business/treat-virtual-id-uid-token-as-aadhaar-number-uidai-to-agencies/articleshow/65038574.cms; Jul. 18, 2018; 3 pgs.
Neustar; "Neustar Selected as Digital Identity Solution Partner for Visa's ID Intelligence Ecosystem"; https://www.home.neustar/about-us/news-room/press-releases/2017/VisaIDIntelligence; Oct. 24, 2017; 1 pg.
Crush Crypto; Selfkey ICO Review—Digital Identity Management System; https://crushcrypto.com/analysis-of-selfkey/; Dec. 5, 2017; 6 pgs.

* cited by examiner

SYSTEMS AND METHODS FOR USE IN MANAGING DIGITAL IDENTITIES

FIELD

The present disclosure is generally directed to systems and methods for use in managing digital identities, and in particular, to systems and methods for use in verifying changed attributes of digital identities prior to disseminating the digital identities to relying entities.

BACKGROUND

This section provides background information related to the present disclosure which is not necessarily prior art.

People are known to be associated with identities. The identities are often verified, by relying parties, through one or more physical documents, such as, for example, driver's licenses, government issued cards or documents (e.g., birth certificates, etc.), utility bills, etc. In addition, digital identities are known, which may include network or Internet equivalents to physical identities of people for identification in connections with network transactions. In connection therewith, when people apply for accounts, they are often required, by issuers of the accounts, to present proof of their identity, which may be provided through one or more such physical documents or via the digital identities. Thereafter, the account issuers or other parties rely on the identities (i.e., the relying parties), evidenced by the physical documents and/or the digital identities, to interact with the people and/or conduct business therewith.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Users often apply for accounts, such as, for example, banking accounts, investment accounts, payment accounts, etc., where the users are required to provide proof of their identities in connection with applying for the accounts. Once presented, and verified, the parties offering the accounts proceed to issue the accounts to the users, where the accounts then reflect certain attributes of the users' identities. Physical documents representing the users' identities as well as digital identities of the users may be relied upon for these purposes. With that said, from time to time, the attributes of the users' identities, such as, for example, mailing addresses, etc., may change.

Uniquely, the systems and methods herein permit attributes of digital identities of users to be changed, once verified by at least one relying party, whereby the digital identities and/or the changed attributes may then be disseminated to multiple other relying parties. In particular, for example, when an attribute of a user is changed, an application associated with a digital identity of the user and provided by an identification provider (e.g., an application including a software development kit (SDK) of an identification provider, etc.) transmits an encrypted message to the identification provider, where the message includes the changed attribute. The identification provider decrypts the message, and generates a hash of the digital identity with the changed attribute. In turn, the identification provider compares the hash to a hash of the digital identity for the user stored at the identification provider. If the hashes match, the user's digital identity is updated as requested. However, if the hashes do not match, the identification provider requests that the user attest to the changed attribute, via the application. When this is required, the user captures an image of a physical document representative of the identity of the user, whereupon an integrity of the image is verified by the application (or the identification provider). When verified, the changed attribute is added to the user's digital identity and stored in a data structure associated with the identification provider. The user's digital identity is further annotated as pending approval. An identification engine may then notify one or more relying parties of the annotation. In response, when the user attempts an interaction with a relying party to open an account, for example, the relying party may seek authentication of the user via the identification provider (and its corresponding application). The SDK then interacts with the relying party to permit the relying party to verify the changed attribute with the user based on the image of the physical document. The relying party then certifies to the identification provider that the changed attribute has been verified, whereupon the identification provider stores a certification in the data structure and annotates the digital identity as approved. The identification provider then notifies the one or more relying parties that the digital identity is approved. In this manner, improper and/or unauthorized changes to digital identities may be inhibited.

Figure 1:
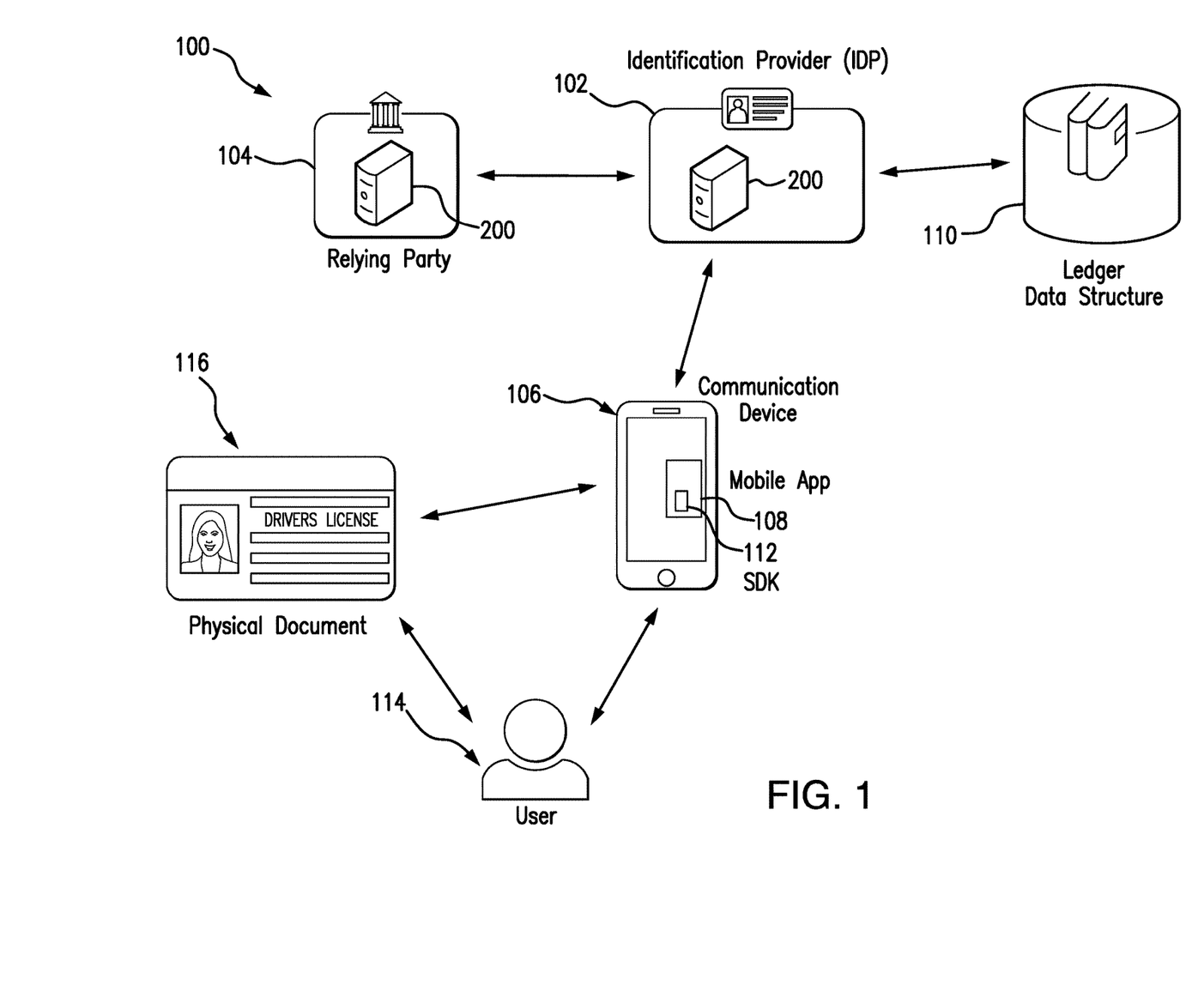
FIG. 1 is an exemplary system of the present disclosure suitable for use in managing digital identities for users.

FIG. 1 illustrates an exemplary system 100, in which one or more aspects of the present disclosure may be implemented. Although the system 100 is presented in one arrangement, other embodiments may include the parts of the system 100 (or other parts) arranged otherwise depending on, for example, relationships between users and identification providers, particular types of devices utilized with digital identities, relationships between users and relying parties, privacy requirements, etc.

The illustrated system 100 generally includes an identification provider (IDP) 102, a relying party 104, and a communication device 106 including a mobile application 108, each of which is coupled to (and is in communication with) one or more networks. The network(s) is/are indicated generally by arrowed lines in FIG. 1, and may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

The IDP 102 of the system 100 generally is associated with providing digital identities for users (e.g., for user 114, etc.) to relying parties, including the relying party 104, in connection with interactions by the users with the relying parties. In FIG. 1, the IDP 102 is illustrated as a standalone service and/or device of the system 100. However, the IDP 102 may additionally, or alternatively, be incorporated in whole or in part with another party in the system 100, such as, for example, a payment network or a banking institution, etc. Specifically, for example, the IDP 102 may be incorporated into the MasterCard® payment network and configured to operate as described herein to provide corresponding services to users via and/or in association with the MasterCard® payment network. In addition, the IDP 102 is associated with a ledger data structure 110. And, while shown as separate from the IDP 102 in FIG. 1, the ledger data structure 110 may be integrated into the IDP 102 in one or more other embodiments.

The communication device 106 of the system 100 is generally associated with the user 114 and includes the mobile application 108, which is configured (via executable instructions) to interact with the IDP 102 in connection with providing, requesting, updating, etc. a digital identity of the user 114 as described herein. Specifically, in this exemplary embodiment, the mobile application 108 includes a software development kit (SDK) 112 associated with the IDP 102, which configures the communication device 106 to interact with the IDP 102, as described herein. What's more, the communication device 106 is associated with the user 114 who, in turn, is associated with an identity. The identity of the user 114 may be evidenced by one or more physical documents, such as physical document 116 (shown as a license issued by a state, regional, or federal government). With that said, it should be appreciated that additional and/or other physical documents for the user 114 may be included in the system 100, such as, for example, a passport, a government issued ID, a social security card, a health insurance card, a bank statement, an employee ID, a library card, a utility bill, etc. The physical document 116 (and other physical documents potentially included in the system 100) then includes one or more attributes of the user 114 and/or of the identity of the user 114, which distinguishes the user 114, alone or in combination, from one or more other users. The attributes may include, without limitation, a name of the user 114, a mailing address, a birthdate, contact information (e.g., a phone number, an email address, etc.), a social security number or other government identification number, or any other desired attribute of the user 114, etc.

In general, the IDP 102 is configured to interact with the user 114 to receive evidence of the identity of the user 114, when necessary, to compile a digital identity for the user. Once such evidence is received and once the user's identity is verified, the IDP 102 is configured to then compile the digital identity for the user 114 and to store the digital identity in the ledger data structure 110 associated with the IDP 102. As such, the ledger data structure 110 includes the user's digital identity and other digital identities for other users, and corresponding certification records therefore (together or separately). In this exemplary embodiment, the ledger data structure 110 includes a block chain data structure, whereby the ledger data structure 110 includes a continually growing list of ordered records (where each record includes a time stamp and a reference or link to a prior record). That said, it should be understood that other, equivalent or not, data structures may be employed in other embodiments for use with the IDP 102 and/or the ledger data structure 110, etc.

Thereafter, the IDP 102 is configured to provision the compiled digital identity for the user 114 to one or more communication devices as appropriate, such as, for example, the communication device 106. The digital identity may then be provided, by the user 114 (via the communication device 106, etc.), to one or more relying parties, such as the relying party 104, when requested and/or in connection with an application for an account by the user 114 at the relying party 104, or otherwise. In connection therewith, the relying party 104 is able to and does rely on the digital identity of the user 114 (and digital identities associated with other users) to satisfy, for example, proof of identity and/or know your customer (KYC) requirements, etc. (e.g., when the relying party 104 includes a financial institution that issues account to users, etc.).

Figure 2:
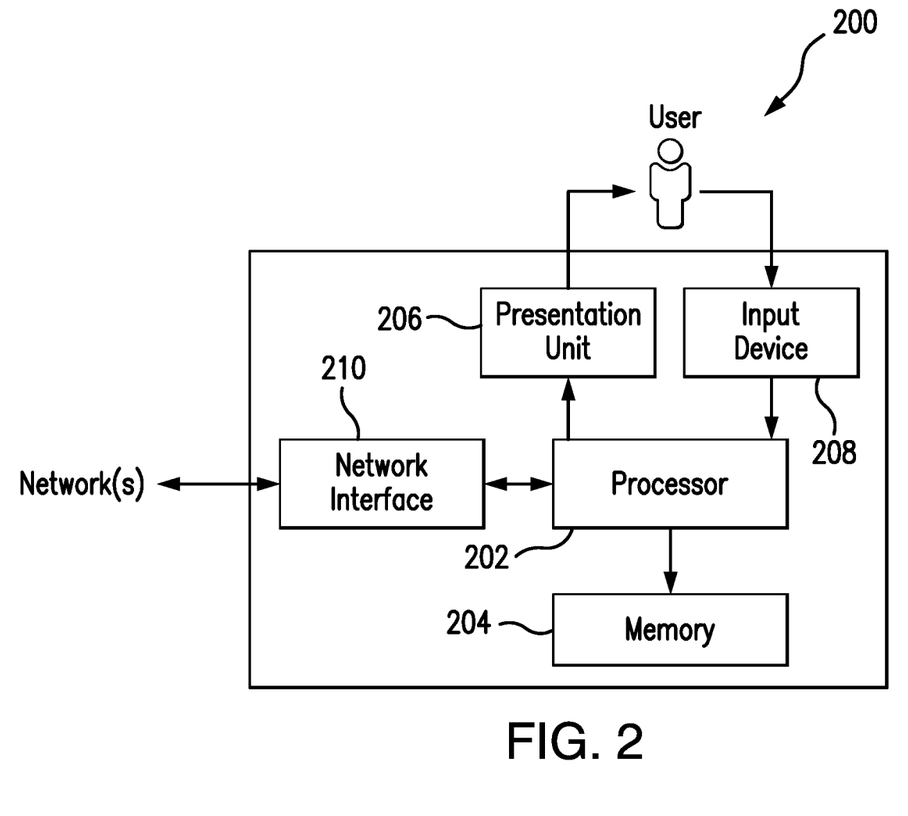
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the IDP 102 and the relying party 104 is illustrated as including, or being implemented in, computing device 200, coupled to (and in communication with) one or more networks. In addition, each of the communication device 106 associated with the user 114 and the ledger data structure 110 can be considered a computing device generally consistent with computing device 200 for purposes of the description herein. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity attributes, digital identities, certificates, ID data, document images, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., prompts to present a document showing a changed attribute, etc.), visually or audibly, for example, to a user of the computing device 200 (e.g., user 114 associated with the communication device 106, etc.), etc. And various interfaces (e.g., as defined by the mobile application 108, or as defined by one or more websites, etc.) (e.g., including instructions to scan a particular document, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) of the computing device 200 such as, for example, images of documents, etc., in response to prompts from the mobile application 108 (and/or the SDK 112), as further described below. The input device 208 may include a single input device or multiple input devices. The input device 208 is coupled to (and is in communication with) the processor 202 and may include, for example, one or more of a keyboard, a pointing device, a mouse, a stylus, a camera, a touch sensitive panel (e.g., a touch pad or a touch screen, etc.), another computing device, and/or an audio input device. In various exemplary embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, or other device capable of communicating to one or more different ones of the networks herein and/or with other devices described herein. In some exemplary embodiments, the computing device 200 may include the processor 202 and one or more network interfaces incorporated into or with the processor 202.

Referring again to FIG. 1, in response to a request to change an attribute of the user's identity, the user 114 provides the changed attribute to the mobile application 108 at the communication device 106. In response, the communication device 106, as configured by the SDK 112, notifies the IDP 102 of the changed attribute and generates an encrypted message, which includes the digital identity attributes for the user 114 held by the communication device 106 (in whole or in part) along with the changed attribute. The communication device 106 is configured, by the SDK 112, to then transmit the encrypted message to the IDP 102, via one or more networks.

In response, the IDP 102 is configured to generate a hash of all the data received from the communication device 106, and to decrypt the message and retrieve a digital identity record for the user 114 from the ledger data structure 110. The digital identity record either includes a hash for the digital identity, or the IDP 102 is configured to generate a hash for the digital identity record from the ledger data structure 110. In either case, the IDP 102 is configured to compare the hash from the ledger data structure 110 and the hash for the received message. Because there is a changed attribute, in this example, the hashes will not match. As such, in response to the encrypted message, the IDP 102 is configured to transmit a request to the mobile application 108 for the user 114 to attest to the changed attribute.

The user 114, via the communication device 106, receives the request and presents the physical document 116 to the communication device 106. The communication device 106, as configured by the mobile application 108 and/or the SDK 112, captures an image of the physical document 116 (e.g., via a camera input device 208 of the communication device 106, etc.) and checks the integrity of the image (e.g., to determine (or estimate) whether the image and/or the physical document is genuine, false, and/or fake, etc.). The image may then be stored in memory (e.g., memory 204, etc.) of the communication device 106. If the image is not determined (or estimated) to be false/fake, the communication device 106, as configured by the SDK 112, confirms the integrity of the image to the IDP 102. In turn, based on the confirmation, the IDP 102 is configured to write an updated digital identity record for the user 114 to the ledger data structure 110, in the block chain thereof. The updated digital identity record includes the new attribute for the user 114 and a reference back to the original digital identity record for the user 114. Additionally, the IDP 102 is configured to annotate the updated digital identity record with a status of "pending approval" or other suitable status to indicate that the change is pending and then to broadcast the annotation to relying parties for the digital identity of the user 114 (e.g., to all relying parties that have previously requested the digital identity of the user 114, to all relying parties associated with the IDP 102, etc.). In some exemplary embodiments, the ledger data structure 110 may include a listing of relying parties associated with the user 114 and/or the user's digital identity (e.g., based on prior interactions between the user 114 and the relying parties, based on input and/or selection of the relying parties by the user 114, etc.). And, in connection therewith, the IDP 102 may be configured to broadcast the annotation for the user's digital identity to the particular relying parties included in the ledger data structure 110 as associated with the user 114 and/or the user's digital identity (e.g., only to those relying parties, etc.).

Subsequently, when the user 114 attempts to access a network-based application (e.g., a website, etc.) associated with the relying party 104 (e.g., as part of accessing an existing account with the relying party 104, etc.), the relying party 104 is configured to identify the annotation of the digital identity and to challenge the user to complete a biometric authentication (or other authentication), via the communication device 106 and, specifically, the mobile application 108. When the biometric authentication is completed (and with the user 114 authenticated), the communication device 106, as configured by the SDK 112, generates an encrypted message, which includes the physical document 116 (specifically, the image associated therewith) associated with the user 114 (as previously captured by the communication device 106), and transmits the same to the relying party 104. The relying party 104, in turn, verifies the physical document 116 in one or more manners. For example, in the current description the physical document 116 includes a license issued by a state, regional, or federal government. As such, the relying party 104 may interact with the issuing government (or with a verification service that then interacts with the issuing government, etc.) to verify the physical document 116. Alternatively, the relying party 104 may interact with the IDP 102 whereby the IDP 102 (as a service) verifies the physical document 116 and/or communicates with a third party verification provider that then, in turn, interacts with an issuing authority for the physical document 116 to verity the document 116 (e.g., regardless of a type of the physical document 116, etc.). In any case, when verified, the relying party 104 is configured to compile and transmit a certification for the updated digital identity of the user 114 to the IDP 102, which is configured to record the certification to the ledger data structure 110. Thereafter, the IDP 102 is configured to annotate the updated digital identity with a status of "approved" or other suitable status indicative of the above process, and to broadcast the annotation to the relying party 104 (and potentially other relying parties associated with the user 114 and/or the user's digital identity in the ledger data structure 110) for the digital identity of the user 114. This informs the relying party 104 of the change to the user's digital identity and the certification to the change, such that the relying party 104 is able to also rely on the new/updated digital identity, including the changed attribute.

Figure 3:
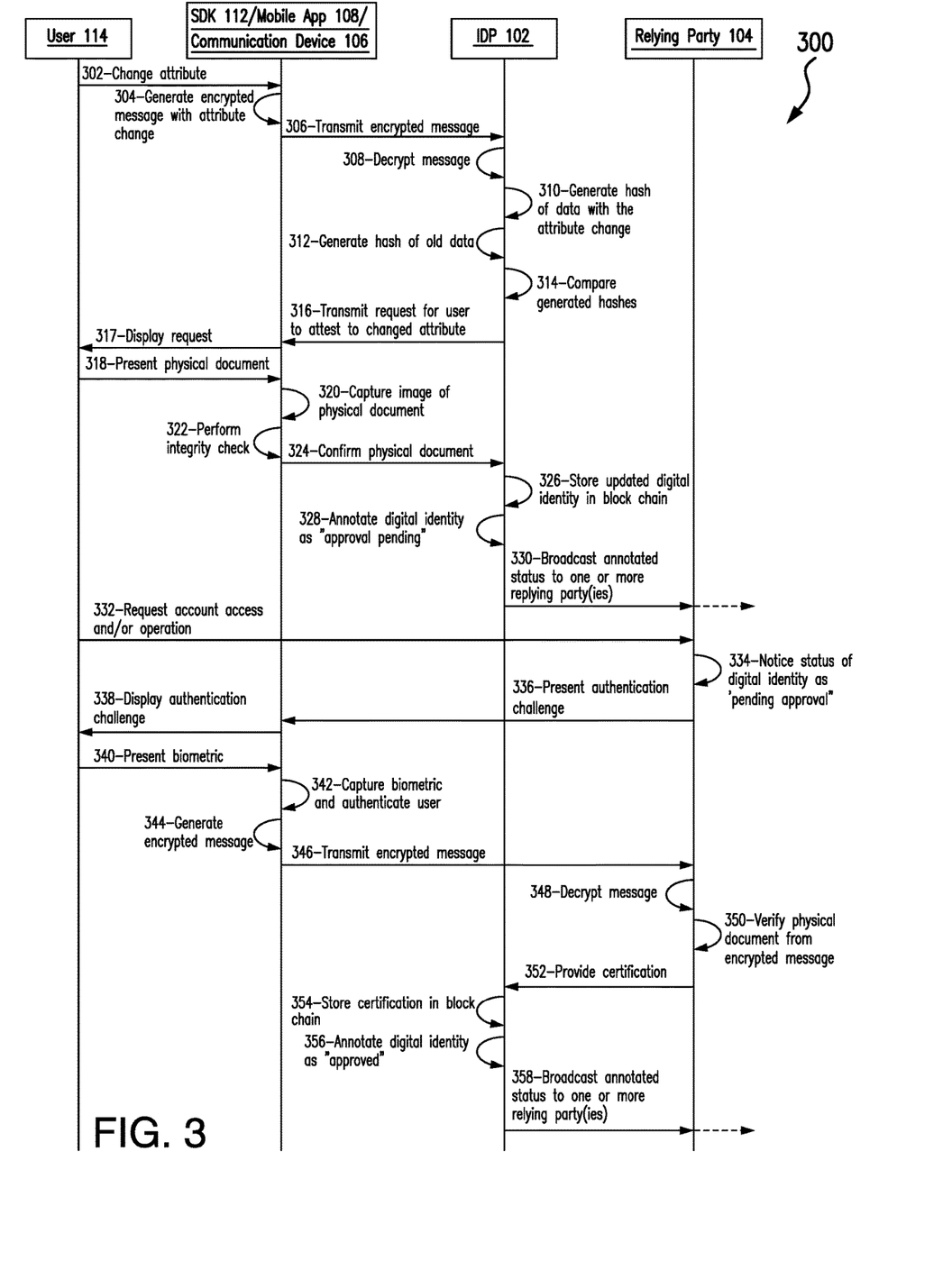
FIG. 3 includes a flow diagram for an exemplary method, which may be implemented in connection with the system of FIG. 1 for verifying at least one attribute change for a user, for a digital identity associated with the user, prior to imposing the change, whereupon the updated digital identity may then be disseminated to relying parties.

FIG. 3 illustrates an exemplary method 300 for use in verifying at least one attribute change of a user, for a digital identity associated with the user, prior to imposing the change, whereupon the user's digital identity with the change may then be disseminated to relying parties. The exemplary method 300 is described as implemented in the IDP 102, the relying party 104, the communication device 106, and the ledger data structure 110 of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

In the method 300, the user 114 is associated with an exemplary digital identity that includes, for example, a name (e.g., John Smith), a mailing address (e.g., 123 Main Street in Purchase, N.Y.), a birthdate (e.g., Jan. 1, 2001), a government ID (e.g., 123-45-6789), an email address (e.g., jsmith@email.com) and a phone number (e.g., 123-456-7890). This identity of the user 114 is represented in Table 1 below. A digital identity including the attributes of the user 114 shown in Table 1 is also included in the ledger data structure 110, as well as (potentially) at the user's communication device. It should be appreciated that digital identities may include more, less, or different attributes of users in other embodiments.

TABLE 1

| Attribute | Value |
| --- | --- |
| Name | John Smith |
| Mailing Address | 123 Main Street |
|  | Purchase, New York |
| Birthdate | Jan. 1, 2001 |
| Government ID | 123-45-6789 |
| Email Address | jsmith@email.com |
| Phone Number | 123-456-7890 |

As occurs from time to time, the user 114, in this example, moves from one residence to another, whereby the mailing address of the user is changed. As such, the digital identity for the user 114 stored in the block chain of the ledger data structure 110 is no longer accurate. To update the digital identity maintained and provided by the IDP 102, the user 114 accesses the mobile application 108, at the communication device 106, and changes, at 302 in the method 300, the mailing address attribute of his/her identity from "123 Main Street in Purchase, N.Y.," to "456 Main Street in Winghaven, Mo." In this example, no other attributes of the user's identity are changed.

In response, the SDK 112 of the communication device 106 generates, at 304, an encrypted message, which includes the digital identity of the user 114 (i.e., the data included in Table 1) as stored at the communication device 106 and also the new mailing address for the user 114. The data is encrypted using a public key (e.g., associated with the IDP 102 as a provider of the SDK 112, associated with the relying party 104, etc.) and signed using a private key associated with the user 114 (e.g., associated with the user's communication device 106, the mobile application 108, the SDK 112, etc.). Thereafter, the SDK 112, and broadly, the communication device 106, transmits, at 306, the encrypted message to the IDP 102. The IDP 102 receives the encrypted messages and, initially, decrypts the message, at 308, using its private key. Once the message is decrypted, the IDP 102 generates, at 310, a hash of the data received from the SDK 112 in the message, including, for example, a hash of the data shown in Table 1, and a hash of the updated address data for the user. In addition, the IDP 102 retrieves a digital identity record for the user 114 in the ledger data structure 110 and generates, at 312, a hash of the data of the retrieved digital identity (i.e., the name, mailing address, birthdate, government ID, email address, and phone number generally corresponding to the data received from the user 114). It should be appreciated that any suitable hash function may be used herein, including, for example, the MD5 hash function, the SHA-1 hash function, the SHA-2 hash function, the SHA-256 hash function, etc., or one or more other functions suitable and/or conventional to provide a digital signature of the data subjected to the given functions, etc. With that said, an example of a SHA-256 hash for identity data of a user, including a name of the user and a date-of-birth of the user, is provided in Table 2.

TABLE 2

| SHA-256 Hash |
| --- |
| 382FD9ED10996833DA7AA9664A96C56E7CF83683D440E338129C68EF61716945 |

Then, at 314, the IDP 102 compares the hashes and, here, given the change in the mailing address for the user 114, the IDP 102 finds no match by the comparison. As such, in this example, the IDP 102 transmits a request for the user 114 to attest to the changed attribute, at 316. In turn, the request is displayed to the user 114, by the communication device 106, at 317, and the communication device 106 solicits the user 114 to present a physical document evidencing the changed attribute (e.g., document 116, etc.). At 318, the user 114 presents the physical document 116 (and provides a user input to the input device 208 of the communication device 106, indicating the same), whereupon the communication device 106 captures an image of the physical document 116, at 320. In connection therewith, the communication device 106 and/or the SDK 112 performs an integrity check, at 322, of the captured image of the document 116, to confirm that the image is of a genuine physical document and/or to determine if the image and/or the physical document 116 is fake and/or false. In particular, for example, the SDK 112 may determine the integrity of the image based on the ICAO 9303 standard (e.g., to determine or define whether the captured image of the physical document 116 and/or the physical document 116 itself is a good machine readable document or not, etc.) or based on one or more other suitable standards, as is conventional. In connection therewith, the SDK 112 may further perform one or more quality checks on the image to initially ensure the integrity and/or validation of the image may be performed based on one or more suitable standards known to those skilled in the art. When the integrity of the captured image is confirmed and/or not challenged, the SDK 112, via the communication device 106, confirms the physical document 116 to the IDP 102, at 324. In addition, the communication device 106 may store the captured image of the physical document 116 in memory thereof (e.g., memory 204, etc.). What's more, the SDK 112 may verify the changed attribute in the physical document 116 (e.g., verify that the physical document 116 includes the changed attribute, etc.) and convey such verification to the IDP 102 (e.g., as part of confirming the physical document to eth IDP 102 at 324, etc.) and/or convey such verification to the relying party 104 (as appropriate).

In turn in the method 300, the IDP 102 stores an updated digital identity, or part thereof, in the block chain in the ledger data structure 110, at 326, and annotates the digital identity with "pending approval" or other suitable status, at 328. The IDP 102 then broadcasts, at 330, the status of the digital identity to one or more relying parties, including the relying party 104 (and other relying parties as indicated by the dotted line). The broadcast status may simply include a flag for the user's digital identity, or it may include the entire digital identity for the user 114 including the changed attribute. And, as described above in the system 100, the relying parties to which the status of the user's digital identity is broadcast may include relying parties indicated in the ledger data structure 110 as being associated with the user 114 and/or the user's digital identity, and/or it may include one or more other desired relying parties.

Subsequently in the method 300, when the user requests, at 332, account access (e.g., to view his/her account balance, etc.) and/or other operation (e.g., a balance transfer, a payment, etc.) from the relying party 104, or requests other interactions with the relying party 104, the relying party 104 recognizes or notices, at 334, the status of the digital identity of the user as "pending approval" and presents an authentication challenge to the user 114, via the communication device 106, at 336. In turn, the communication device 106 displays the authentication challenge to the user 114, at 338, at presentation unit 206 of the communication device 106. In response, the user 114 presents, for example, a biometric, at 340 (or other requested response to the challenge). The communication device 106 captures the biometric and authenticates the user, at 342 (e.g., compares the captured response to a reference response stored at the communication device 106, etc.). When authenticated, the communication device 106, and specifically the SDK 112, generates an encrypted message, at 344, using the public key of the relying party 104 (and signed using the private key associated with the user 114 (e.g., associated with the user's communication device 106, the mobile application 108, the SDK 112, etc.)) confirming the authentication of the user 114 and including the image of the physical document 116 (as previously captured by the communication device 106, at 320). In turn, the communication device 106, and specifically the SDK 112, transmits the encrypted message to the relying party 104, at 346.

Upon receipt, the relying party 104 decrypts the message, at 348, using its private key and then verifies the image of the physical document 116 (as included in the encrypted message), at 350. Once the image/physical document 116 is verified, the relying party 104 provides a certification to the IDP 102, at 352, therefore. In response, IDP 102 signs the changed attribute for the user 114 in connection with the user's digital identity and encrypts the data to indicate that it certifies the user's data. The IDP 102 then stores the certification received from the relying party 104 in connection with the digital identity, at 354, in the block chain in the ledger data structure 110 (and, in some embodiments, the received image of the physical document 116). In addition, the IDP 102 annotates the updated digital identity with "approved" or other suitable status, at 356. And, finally, the IDP 102 broadcasts, at 358, the approved status of the digital identity to the relying party 104 (and other relying parties as indicated by the dotted line).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a computing device, an encrypted message from a communication device associated with a user, the encrypted messaging including at least one changed attribute for the user; (b) generating a hash of a digital identity for the user with the at least one changed attribute; (c) generating, by the computing device, a hash of the digital identity of the user stored in a ledger data structure; (d) transmitting a request for the user to attest to the at least one changed attribute when the generated hashes do not match; (e) broadcasting a pending status of the digital identity of the user to a relying party for the digital identity; (f) storing a certification of the at least one changed attribute, received from the relying party in response to the pending status, based on verification of the at least one changed attribute by the relying party, thereby adopting the relying party verification of the at least one changed attribute; (g) receiving, from the communication device associated with the user, in response to the request for the user to attest to the at least one changed attribute, a confirmation of integrity of a physical document for the user as captured at the communication device; (h) annotating the digital identity with the pending status based on the confirmation of the physical document; (i) receiving the certification of the at least one changed attribute from the relying party; (j) annotating the digital identity with an approved status based on the certification from the relying party; and (k) broadcasting the approved status of the digital identity of the user to the relying party and/or at least one additional relying party.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in managing a digital identity for a user, the method comprising:

receiving, at an identification provider (IDP) computing device, an encrypted message from a communication device associated with a user, the encrypted message including a first digital identity for the user with at least one changed attribute;

generating, by the IDP computing device, a first hash of the first digital identity;

retrieving, by the IDP computing device, a second digital identity for the user from a ledger data structure;

generating, by the IDP computing device, a second hash of the second digital identity;

comparing, by the IDP computing device, the generated first hash of the first digital identity and the generated second hash of the second digital identity;

determining, by the IDP computing device, that the generated first and second hashes do not match;

transmitting, by the IDP computing device, a confirmation request to the communication device in response to the generated first and second hashes not matching, the confirmation request including an instruction for the user to attest to the at least one changed attribute and to capture, at the communication device, an image of a physical document including the at least one changed attribute;

receiving, by the IDP computing device, confirmation data from the communication device for the at least one changed attribute, the confirmation data based on the image of the physical document;

in response to the confirmation data, broadcasting, by the IDP computing device, a pending status of an updated digital identity for the user to a relying party, wherein the updated digital identity is based on the second digital identity for the user from the ledger data structure and the at least one changed attribute;

receiving, by the IDP computing device, from the relying party, a certification for the at least one changed attribute in response to broadcasting the pending status, the certification indicative of the at least one changed attribute being verified by the relying party; and storing, by the IDP computing device, the certification for the at least one changed attribute in the ledger data structure, the stored certification indicative of verification of the at least one changed attribute.

2. The computer-implemented method of claim 1, wherein the confirmation data includes a confirmation of integrity of the physical document including the at least one changed attribute; and wherein the method further comprises:

receiving, by the IDP computing device, from the communication device associated with the user, in response to the confirmation request, the confirmation of integrity of the physical document for the user based on the image of the physical document; and prior to broadcasting the pending status of the updated digital identity, annotating, by the IDP computing device, the updated digital identity with the pending status based on the confirmation of integrity of the physical document.

3. The computer-implemented method of claim 2, further comprising storing, by the IDP computing device, the updated digital identity in the ledger data structure in response to the confirmation of the integrity of the physical document received from the communication device.

4. The computer-implemented method of claim 1, further comprising:

annotating, by the IDP computing device, the updated digital identity with an approved status based on the certification from the relying party; and in response to the annotated approved status, broadcasting, by the IDP computing device, the approved status of the updated digital identity for the user to the relying party and/or at least one additional relying party.

5. The computer-implemented method of claim 1, wherein generating the first hash of the first digital identity includes generating the first hash based on all the data included in the first digital identity and in the encrypted message.

6. The computer-implemented method of claim 1, wherein the relying party includes at least one banking institution; and wherein the IDP computing device is included in a payment network.

7. The computer-implemented method of claim 1, further comprising:

generating and transmitting, by the communication device, the encrypted message indicative of the at least one changed attribute;

displaying, by the communication device, the request for the user to attest to the changed attribute;

capturing, by the communication device, the image of the physical document presented to the communication device, in response to the request; and confirming, by the communication device, an integrity of the physical document to the computing device.

8. A system for use in managing a digital identity for a user, the system comprising:

a memory comprising digital identities for multiple users; and a processor in communication with the memory, the processor configured to:

receive an encrypted message from a communication device associated with a user, the encrypted message including a digital identity of the user with at least one changed attribute;

generate a hash of the digital identity of the user included in the encrypted message;

retrieve a digital identity of the user from the memory and generate a hash of the retrieved digital identity;

compare the hash of the digital identity of the user included in the encrypted message to the hash of the retrieved digital identity and, when the generated hashes do not match:

transmit a request to the communication device associated with the user, wherein the request includes an instruction for the user to attest to the at least one changed attribute and to capture an image of a physical document that includes the at least one changed attribute at the communication device;

in response to confirmation data from the communication device of the at least one changed attribute:

annotate a status of the digital identity of the user in the memory as pending approval; and broadcast the pending approval status of the digital identity of the user in the memory to a relying party associated with the digital identity in the memory;

receive, from the relying party, a certification for the at least one changed attribute in response to the broadcasted pending approval status, the certification including data indicative of verification of the at least one changed attribute by the relying party; and store the certification in the memory in association with the digital identity of the user in the memory, the stored certification indicative of the verification of the at least one changed attribute.

9. The system of claim 8, wherein the processor is further configured to identify the relying party in the memory as associated with the digital identity of the user in the memory prior to broadcasting the pending approval status of the digital identity of the user to the relying party.

10. The system of claim 9, wherein the processor is further configured to:

annotate the status of the digital identity of the user in the memory with an approved status based on the certification from the relying party; and in response to the annotated approved status, broadcast the approved status of the digital identity of the user in the memory to the relying party and/or at least one additional relying party associated with the digital identity of the user in the memory.

11. The system of claim 10, wherein the processor is configured, in connection with generating the hash of the digital identity of the user included in the encrypted message, to generate said hash based on all the data included in the digital identity and received from the communication device in the encrypted message.

12. The system of claim 8, further comprising the communication device, wherein the communication device includes a camera input device and a processor coupled to the camera input device;

wherein the communication device is configured, via executable instructions, to:

capture, via the camera input device of the communication device, the image of the physical document, in response to the request transmitted by the processor; and confirm, via the processor of the communication device, an integrity of the physical document to the processor of the system.

13. The system of claim 12, wherein the processor of the system is configured, in connection with annotating the status of the digital identity of the user in the memory as pending approval, to annotate the status of the digital identity of the user in the memory as pending approval in response to the confirmation of the integrity of the physical document by the communication device.

14. The system of claim 8, further comprising a payment network, the payment network including the processor.

15. A non-transitory computer-readable storage media including executable instructions for managing a digital identity for a user, which, when executed by at least one processor, cause the at least one processor to perform the steps of:

receiving an encrypted message from a communication device associated with a user, the encrypted message including at least one changed attribute for the user;

generating a first hash of a first digital identity for the user with the at least one changed attribute, as received from the communication device;

retrieving a second digital identity for the user from a ledger data structure;

generating a second hash of the second digital identity for the user;

transmitting, to the communication device, a request for the user to attest to the at least one changed attribute when the generated first and second hashes do not match, wherein the request includes an instruction for the user to capture, at the communication device, an image of a physical document that includes the at least one changed attribute;

receiving, from the communication device, in response to the request, a confirmation of integrity of the physical document for the user captured at the communication device and associated with the at least one changed attribute;

in response to the confirmation of the integrity of the physical document:

annotating an updated digital identity for the user in the ledger data structure with a pending status, based on the confirmation of the physical document, wherein the updated digital identity is based on the second digital identity and the at least one changed attribute; and broadcasting the pending status of the updated digital identity for the user to a relying party for the digital identity;

receiving a certification for the at least one changed attribute from the relying party in response to the broadcasted pending status, the certification including data indicative of verification of the at least one changed attribute by the relying party; and storing the certification, received from the relying party, in association with the updated digital identity for the user in the ledger data structure, the stored certification indicative of the verification of the at least one changed attribute.

16. The non-transitory computer-readable storage media of claim 15, wherein the executable instructions, when executed by the at least one processor, further cause the at least one processor to perform the steps of: generating and storing the updated digital identity for the user in the ledger data structure in response to the confirmation of the integrity of the physical document received from the communication device.

17. The non-transitory computer-readable storage media of claim 15, wherein the executable instructions, when executed by the at least one processor, further cause the at least one processor to perform the steps of:

annotating the updated digital identity for the user in the ledger data structure with an approved status, based on the certification from the relying party; and in response to the annotated approved status, broadcasting the approved status of the updated digital identity for the user to the relying party and/or at least one additional relying party.

* * * * *